(12) United States Patent
Deutschmann et al.

(10) Patent No.: US 10,657,234 B2
(45) Date of Patent: May 19, 2020

(54) METHOD, COMPUTER PROGRAM, AND SYSTEM TO REALIZE AND GUARD OVER A SECURE INPUT ROUTINE BASED ON THEIR BEHAVIOR

(71) Applicant: BehavioMetrics, Lulea (SE)

(72) Inventors: Ingo Deutschmann, Frankleben (DE); Tony Libell, Lulea (SE); Johanna Skarpman Munter Sundholm, Gammelstad (SE); Peder Nordström, Lulea (SE); Philip Lindblad, Lulea (SE)

(73) Assignee: BEHAVIOMETRICS AB, Lulea (SE)

( * ) Notice: Subject to any disclaimer, the term of this patent is extended or adjusted under 35 U.S.C. 154(b) by 276 days.

(21) Appl. No.: 15/830,104

(22) Filed: Dec. 4, 2017

(65) Prior Publication Data
US 2019/0065712 A1 Feb. 28, 2019

Related U.S. Application Data

(60) Provisional application No. 62/552,525, filed on Aug. 31, 2017.

(51) Int. Cl.
G06F 21/31 (2013.01)
G06F 21/83 (2013.01)
H04L 29/06 (2006.01)

(52) U.S. Cl.
CPC ............ *G06F 21/316* (2013.01); *G06F 21/83* (2013.01); *H04L 63/08* (2013.01); *H04L 63/0807* (2013.01); *H04L 63/0838* (2013.01); *H04L 63/168* (2013.01)

(58) Field of Classification Search
CPC ....... G06F 21/316; G06F 21/83; H04L 63/08; H04L 63/0807; H04L 63/0838; H04L 63/168
See application file for complete search history.

(56) References Cited

U.S. PATENT DOCUMENTS

2017/0195356 A1* 7/2017 Turgeman ........... H04L 63/1425
2017/0228525 A1* 8/2017 Wajs ........................ G06F 21/36
2018/0083941 A1* 3/2018 Thakkar .................. H04L 63/08

* cited by examiner

Primary Examiner — Shin-Hon (Eric) Chen
Assistant Examiner — Jessica J South
(74) Attorney, Agent, or Firm — Michael J. Feigin, Esq.; Feigin and Fridman LLC

(57) ABSTRACT

A computer-implemented method, program-code, web-client device and computer system to realize and guard over a secure input routine based on their behavior.

26 Claims, 3 Drawing Sheets

```
function getOTJS (userId, sessionId)
{
  ID = generate_random_UID();
  seed = generate_random_long();
  token = new token(ID, seed, userId, sessionId);
  save(token);
  otjs = getBasicJavaScript();
  otjs = randomizeJavaScript(otjs, seed);
  otjs = obfuscateJavaScript(otjs, seed);
  otjs = addId(otjs, ID);
  return otjs;
}
```

9

```
function validateOTJS(timingData)
{
  ID = getId(timingData);
  userId = getUserId(timingData);
  sessionID = getSessionId(timingData);
  token = getToken(ID);
  if token not exists
    return false;
  if token is expired
    return false;
  if token is used
    return false;
  if userId is not equal to getUserId(token)
    return false;
  if sessionId is not equal to getSessionId(token)
    return false;
  timing = decodeOTJS(timingData, getSeed(token));
  set token used;
  if timing is corrupted
    return false;
  return timing;
}
```

METHOD, COMPUTER PROGRAM, AND SYSTEM TO REALIZE AND GUARD OVER A SECURE INPUT ROUTINE BASED ON THEIR BEHAVIOR

BACKGROUND OF THE INVENTION

1. Field of the Invention

The principles of the present disclosure relate generally to an authentication system, an authentication method, and an authentication software program. More particularly the disclosed invention relates to a system, a method, and a software program for a web-application including a secure input routine for securely providing authentication-related information.

Other embodiments of the invention relate to corresponding computer systems, apparatus, and computer programs stored on one or more computer storage devices, each configured to perform the method of the present invention.

2. Description of the Related Art

JavaScript Object Notation (JSON) is a lightweight data-interchange format and an open-standard file format that uses human-readable text to transmit data objects. As such, JSON is easy for people to read and write while also being easy for machines to parse and generate. JSON is based on two structures: objects and arrays.

A JSON object is an unordered set of name/value pairs. Each JSON object is defined and enclosed within a pair of braces (i.e. begins with a left brace ({) and ends with a right brace (})). Each name/value pair inside an object is separated by a comma (,) and, within each name/value pair, the name is followed by a colon (:). For example, a JSON object representing first names and family names of the members of the Beatles would be {Ringo: Star, Paul: McCartney, John: Lennon, George: Harrison}. A JSON array is an ordered collection of values. Each JSON array is defined by and enclosed with a pair of brackets (i.e. begins with a left bracket ([) and ends with a right bracket (])). Values within a JSON array are separated by commas (,).

Security Assertion Markup Language (SAML) is an open standard for exchanging authentication and authorization data between parties. SAML tokens and other authentication data can be securely transmitted using JSON. For example the "id" of a file may be transmitted within a JSON text:

```
{"menu": {
    "id": "file",
    "value": "File",
    "popup": {
      "menuitem": [
        {"value": "New", "onclick": "CreateNewDoc( )"},
        {"value": "Open", "onclick": "OpenDoc( )"},
        {"value": "Close", "onclick": "CloseDoc( )"}
      ]
    }
}}.
```

A JavaScript interpreter may be used to execute JSON code dynamically as embedded JavaScript, for example by calling the JavaScript eval( ) function. However, such execution of JSON code may expose a program to errant or malicious scripts, for example if such are included in the JSON code. As such, there is a possible gateway for fraudsters to identify JavaScript web-pages including JSON code and to read, analyze, and/or modify the JSON code so as to retrieve or phish from the JavaScript page authentication-related information.

U.S. Patent Application Publication 2015/0341176 describes a method for digitally signing JSON code, which may be used in web based authentication methods and systems.

U.S. Patent Application Publication US2011/0099629 discloses a method for detecting whether a digital document, such as an HTML document, is changed by anyone other than an authenticated script code, for example an unauthenticated JavaScript code.

In some prior art systems, in order to call a function only one time for a given web-page, the native JavaScript has to be enlarged, such as with the function 'once(fn, args, unique)', whereby "fn" is a pointer to the function which should run only one time, "args" is a pointer to a list of arguments needed by the function fn, and "unique" is a one-time token linking the function to some related functions. This kind of enlarged JavaScript is labeled One-Time JavaScript (OT-JS).

In many prior art systems, a user who wants to access a service, such as for performing an electronic transaction using an electronic application, is asked to enter his Log-In and password to authenticate the user as the credentialed or legal one.

U.S. Patent Application Publication 2008/0091453, which relates to a system for electronic transaction authorization at a fixed money machine, discloses a method of using behavioral biometric algorithms using the keyboard dynamics of a device in order to distinguish the behavior of one human from that of another human when a user is employing a system input. However, this disclosure does not include any exchange of authentication related data via web services.

Desktop computers, mobile devices, and tablet computers typically have no built-in security mechanisms for user authentication with web services and applications, besides for traditional Personal Identification Number (PIN) authentication and/or interaction with additional devices, such as smart cards or One-Time Password (OTP) tokens. In some such devices, authentication is achieved using the service application "OTP Safe", which makes use of a Time-based One-Time Password (TOTP) algorithm commonly used with Two-Factor Authentication (2FA). However, it has become clear that the current methods for protecting user information during client-server connections or communications over insecure networks, such as user passwords or their combination with one-time passwords, no longer provide the necessary level of security. Attackers use a combination of increasingly advanced techniques, such as man-in-the-middle attacks, phishing attacks, Domain Name Service (DNS) spoofing, and malware such as viruses and Trojan horses, to obtain information during such connections. In this context, improved protection techniques are required, particularly to secure online financial transactions.

In order for authentication of users to be unobtrusive and not annoying or disruptive, behavioral authentication, which occurs in the background and is transparent to the user, is often preferred. In systems providing such behavioral authentication, there is typically an enrollment phase and an authentication phase. In the enrollment phase, information relating to the behavior of the legal or authorized user is gathered on the client computer, and is transferred to the behaviometric authentication system, which generates a behavioral profile for the authorized user, and stores the profile in a database. In the authentication phase, the information relating to the behavior of the current user is gathered on the client computer, and is sent to the behavioral authentication system. The behavioral authentication system compares the received data with the behavioral profile associated with the authorized user. If the behavior of the current user is similar to the behavior stored in the behavioral profile associated with the authorized user, the current user is granted access to protected applications and/or protected resources.

Furthermore, current systems commonly use Remote Access Service (RAS) for online technical support for client devices such as personal computers, providing support for most modern operating systems. Additionally, one disadvantage of RAS is that it opens a wide gateway for fraudsters to access most device-drivers of the client's system, such as the keyboard, mouse, and display, which are necessary for user interactions.

There is thus a need in the art for an authentication method and system allowing for secure input of authentication-related information for authentication of a user to a web-application.

SUMMARY OF THE INVENTION

The present invention provides a solution to the problems discussed hereinabove and meets the required needs. The present invention relates to a method, a computer program and a computer-system executing an algorithm for authentication of a user to a web-application using a secure input routine for authentication-related information.

In accordance with an embodiment of the teachings herein, there is provided a method for authentication of a user to a web-application based on a client-server-structure, using, on the client side, one or more web-browsers supporting JavaScript for web-pages containing JavaScript, whereby JavaScript is used at least for a secure input routine. The secure input routine executes OT-JS code based on a unique one-time token. At least one input web-page contains the secure input routine, and is used to query a user for authentication-related information. The input web-page includes JSON code which is interpreted and executed by a JavaScript interpreter of the web-browser(s), such that correct execution of the JSON code by the web-browser(s) and/or correct use of the input web-page by the user is ensured by a guard-application on the server side.

By using and guarding JSON code within a secure input routine, which input routine runs only one-time on a web-page, a high level of security for the transmitted authentication-related information is realized. This is particularly useful for a client-server structure, such as a banking application.

In some embodiments, the secure input routine includes at least two input-fields for two different authentication-related information items, such as a PIN number and TOTP, such that the field-names for these input-fields of the JSON code are intermixed on the server side for each one-time token. In other words, for each one-time token, a different, possibly cyclic, code mixture will be generated. a simple reuse of the authentication-related information obtained or stolen by a fraudster program with a new (stolen) one-time token would be unsuccessful because the original web-page was modified by the first and only use of the secure input routine. Such simple reuse will also not run successfully as it has the correct input but in incorrect fields, due to the different combining of fields in the JSON code. Such an attack is detectable by the guard-application on the server side.

In some embodiments, the OT-JS code of the input routine uses a one-time token to limit the validity of the JavaScript so as to protect against reuse. In some such embodiments, the limitation of validity is in real-time and is configurable using a server based dashboard of a supervising authority. Thus, the input routine is capable of dynamically responding to current changes in the environment, such as a change in the data security level.

In some embodiments, the OT-JS code of the input routine uses obfuscation techniques to complicate the possibility of machine-reading the code to re-sample it. Thus, the JavaScript code is obfuscated to prevent malicious tampering, by making the code harder to understand and to change. Unlike most of the obfuscation tools available, the OT-JS obfuscation is carried out dynamically for each generation of the code, so the script code is different every time.

In some embodiments, the OT-JS code of the input routine causes rearranging of the data-field headers thus adding extra security and deterring reverse engineering. In some embodiments, formats and identifiers used for representing time data may be randomly, for example cyclicly, changed every time the code is called. This makes it impossible for a man-in-the-middle attacker to replace the timing data, or to reuse old data with a newly generated token. As such, also successfully re-sampled OT-JS will likely not work well.

In some embodiments, the rearranging of the data-field headers also includes creation of (senseless) dummy data and/or internal data by JavaScript functions of the web-browser. As such, the number of data-field headers may be increased from two to a larger number, for example greater than 10, and consequently the number of possible permutations is prohibitively large for a brute force attack.

In some embodiments, the server-side guard-application includes an invalidation method which discards an access request having an invalid format or invalid validity data, and/or invalidates an token associated with such a request. Consequently, use of data transmitted by an invalid request is impossible.

In some embodiments, the secure input routine contains a behavioral authentication procedure which runs in the background. The behavioral authentication routine gathers characteristic timing data of each keystroke carried out by the user to be authenticated, as well as mouse data, accelerometer, gyroscopic and magnetometric data, when available. Such behavioral authentication procedures are described in Applicants U.S. Pat. Nos. 9,298,912, 9,531,710, and 9,542,541, which are incorporated by reference as if fully set forth herein. As such, a behavioral authentication system is usable for verifying that the user requesting access is the authorized user based on the characteristic timing data of each keystroke and data obtained from other modalities.

In some embodiments, when collecting the characteristic time data, the character-key pressed is ignored and is represented by its position within a time ordered sequence. As such, the information about the pressed character-keys is lost, while maintaining the characteristic timing data required for authentication. In such embodiments, the actual character-sequence is ignored, but this does not have detrimental impact on the behavioral authentication method since some authentication-related information, such as the password, will rarely change, such that the time ordered sequence would be repeated and the behavioral data associated therewith would be useful for behavioral authentication of the authorized user.

In some embodiments, control-keys, such as "backspace", arrow-keys, "ctrl+C", and "ctrl+V", are represented by a special code, different from the position of the control-key within the time ordered sequence of typing. As such, copying of a password or other information by using copy and paste shortcuts is detectable by the guard-application on the server side.

In some embodiments, the secure input routine contains a Remote Access Detection routine, which runs in the background, together with the gathering of characteristic timing data of keystrokes and/or mouse input, such that remote access is detected by the guard-application on the server side. This is due to the fact that in order to optimize the bandwidth required for remote control of a system, most remote access tools shorten the transmitted simulated input data as much as possible, and such shortened data is detectable by the guard-application.

In some embodiments, timing data of mouse input is gathered. In such embodiments, in a preliminary step, a profile, such as a statistical profile, of detected sample rates of mouse data of the authorized user is built and stored. In a later, second step, the current sample rates of received mouse data are compared with the sample rates in the stored profile. When mouse data is pushed through a remote access tool the data does not match, because the sample rate of the data is distorted by the remote access tool, and thus, it will not match the stored profile of the authorized user's mouse data. Some remote access tools, which do not distort the data of the mouse sample rate, may still be detectable if the remote host uses a mouse with a different sample rate than that of the authorized user. Additionally, the sample rate of the mouse used on the computer running the remote access tool might differ from the sample rate of the mouse used by the current user.

In some embodiments, the mouse sample rate has a lesser weight in the profile of the authorized user than features relating to normal movement, such as velocity, acceleration, and curvature, thus avoiding false positive fraudster detection when the authorized user (having his own velocity, acceleration, curvature) remotely accesses his own desktop or computation device.

In some embodiments, timing data of keyboard input, such as keystrokes, is gathered. In such embodiments, in a preliminary step a statistical profile, such as a statistical profile, of detected sample rates of keyboard data of the authorized user is built and stored. Subsequently, in a later second step, the current sample rates of keyboard data is compared with the sample rate of keyboard data in the stored profile of the authorized user. When keyboard data is pushed through a remote access tool, the sample rate of the data is distorted by the remote access tool, and will not match the stored profile of the authorized user's keyboard data, thereby enabling detection of remote access. Some remote access tools, which do not distort the data of the keyboard sample rate, may still be detectable if the remote host uses a keyboard with a different sample rate than that of the authorized user.

In some embodiments, the dwell times of key presses on the keyboard (i.e. time spent pressing the keys down or allowing the keys to return up) are gathered, and compared to corresponding data stored in the profile of the authorized user. In some such embodiments, a lower threshold of 16 ms for dwell times is used to detect fraudsters. In other words, if a dwell time smaller than 16 ms is detected, the user is assumed to be a fraudster regardless of their actual profile. Some remote access protocols re-sample data from the keyboard and save communication bandwidth by sending both keyboard down and up times simultaneously, which may be detected due to the change from the dwell times stored in the profile of the authorized user.

In some embodiments, the variance of the sample rate of the keyboard is gathered, and may be compared in order to detect remote access. When a key is held down, i.e. pressed and not released, the computer receives a sequence of key down events in an approximately constant sample rate. However, when this sequence of key down events is fed through a remote access tool, the variance of the sample rate is increased, and thus, remote access tools can be detected.

There is further provided, in accordance with an embodiment of the present invention, a program-code which runs, at least in part, as a method as described above on at least one processor of a web-client device such as a tablet, laptop, or desktop computer. As such, the innovative method described herein may become an integrated part of an application or of an operating system for web-client devices.

There is further provided, in accordance with an embodiment of the present invention, a program-carrier, comprising a carrier for a program-code able to run on a web-client device as described above, the program-code comprising code for executing a method as described above.

There is further provided, in accordance with an embodiment of the present invention, a web-client device, comprising:
one or more processors;
a clock;
a storage unit; and
an input device,
wherein code implementing the innovative method described herein runs on at least on one of the one or more processors.

There is further provided, in accordance with an embodiment of the present invention, a system including of a web-client device able to run code implementing a method as described herein, and a program-carrier as described herein. After loading the program-code onto the web-client device by the user, customer, and/or supplier, the inventive solution is available on the web-client device.

There is additionally provided, in accordance with another embodiment of the present invention, a method of authenticating a user to a web-application, to be implemented in a system including a client device and a server, the method including:
receiving from the client device JSON code representing input of a user in at least two input fields, the input received using an input-page via a web browser executing a secure input routine including OT-JS code based on a unique one time token; and
running a guard application to ensure correct execution of the OT-JS code and correct use of the input-page by the user.

In some embodiments, receiving the JSON code includes receiving the JSON code following the secure input routine limiting validity of the JSON code to a single use of the JSON code by use of a one-time token, the limiting being carried out in real time. In some embodiments, receiving the JSON code includes receiving the JSON code following obfuscation of the JSON code by the secure input routine.

In some embodiments, running the guard application includes discarding a web-page request having an invalid format or invalid validity data, and invalidating a one time token associated with the web-page request.

In some embodiments, receiving the JSON code includes receiving the JSON code following the occurrence of at least one of the following by the secure input routine:
a. rearranging of data-field headers of the at least two input fields;
b. randomly changing a format of time data for each use of the OT-JS code;

c. adding dummy data and/or internal data to the JSON code;
d. running a behavioral authentication procedure in the background during the user entering the input, the behavioral authentication procedure gathering characteristic time data of each keystroke of the user to be authenticated.

In some such embodiments, the characteristic time data includes an identification of the character key pressed by the user, and:

an identification of a character-key pressed by the user is anonymized into a position of the pressed character-key within a time ordered sequence of pressed character keys; and an identification of control-keys pressed by the user is anonymized into a special code different from a position of the pressed control key within the time ordered sequence.

In some embodiments, running the guard application includes:

receiving and storing a profile of the detected sample rates of mouse input of an authorized user, detected by the client server; and in a second, subsequent step, comparing currently detected sample rates of mouse data to sample rates of mouse data in the stored profile thereby to determine whether the current user is the authorized user.

In some embodiments, running the guard application includes:

receiving and storing a profile of the detected sample rates of keyboard input of an authorized user, detected by the client server; and in a second, subsequent step, comparing currently detected sample rates of keyboard data to sample rates of keyboard data in the stored profile thereby to determine whether the current user is the authorized user.

In some embodiments, receiving and storing a profile includes receiving an storing a profile additionally including at least one of dwell times for pressing the keys of the keyboard down/up and a variance of the sample rate of the keyboard, and wherein the comparing includes comparing currently detected dwell times or variance to the stored dwell time or variance.

The novel features of the present invention are set forth in the appended claims. The invention itself, however, both its construction and its mode of operation, together with additional advantages and objects thereof, will be best understood from the following detailed description when read with reference to the accompanying drawings.

BRIEF DESCRIPTION OF THE DRAWINGS

FIG. 2 shows exemplary pseudo-code used by the system of FIG. 1 for generation and validation of OT-JS.

A better understanding of the disclosed technology will be obtained from the following detailed description of the preferred embodiments taken in conjunction with the drawings and the attached claims.

DETAILED DESCRIPTION

The disclosed technology relates to a method, a computer program, and a computer-system executing an algorithm for a web-application using a secure input routine for input of authentication-related information, which is useful during authentication of a user to the web-application.

Figure 1:
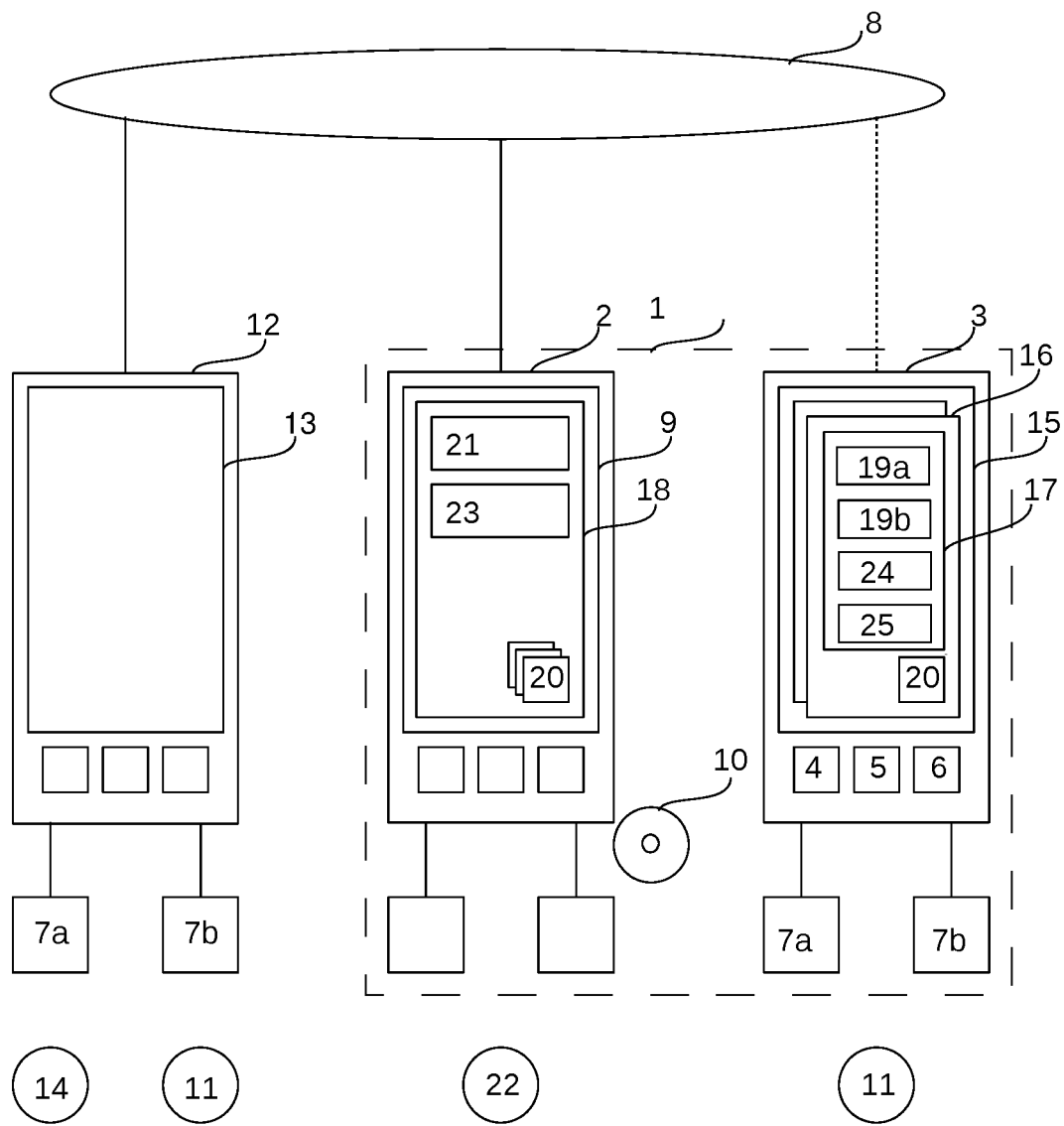
FIG. 1 shows a schematic overview of an exemplary system of an embodiment of the disclosed technology.

Turning to FIG. 1, a system 1 includes a server 2 and a web-client device 3. The web-client device 3 includes a processor 4, a clock 5, a storage element 6, such as a computer memory, and two input devices 7a, 7b. For example, web-client device 3 may be a desktop computer with keyboard 7a and mouse 7b.

The server 2 and the web-client device 3 may be wirelessly connected via a network 8, such as the Internet. Processor 4 of web-client device 3 may run a program code of a method as described hereinbelow. A corresponding program-code for server 2 and thus also in parts for the web-client device 3 may include a web-application 9, which may be contained on a program-carrier 10, such as a Compact Disc (CD), and may be transferred to the server 2 prior to running the method described herein.

In normal use of web-client device 3, the device is only used by an authorized user 11. However, the web-client device 3 may also be accessed remotely by a remote-device 12 running a Remote Desktop Protocol (RDP) 13 and connected with the web-client device 3 and with the server 2 via the network 8. In some embodiments, the remote user is the authorized user 11. In other embodiments, the remote device 12 is a fraudster device, the RDP is a fraudster application, and the user of remote device 12 is a fraudster 14.

The web-application 9 is based on a client-server structure using a web-browser 15 on the client side, for accessing web-pages 16 written in JavaScript. A secure input routine 17 using JavaScript and running on devcie 3 executes OT-JS code based on a unique one-time token 20. The web-page 16 used as an input page contains the secure input routine 17, and is used to query the authorized user 11 for authentication-related information. The input-page includes JSON code which is interpreted and executed by a JavaScript interpreter of the web-browser 15, such that correct execution of the JSON code done by the web-browser 15 and correct use for the input-page by the user is guarded, or ensured, by a guard-application 18 running on the server 2.

More specifically, the secure input routine 17 contains two input-fields 19a and 19b, which receive two different authentication-related information items, a PIN and a TOTP. Though the field-names for these information items are typically "login" and "password", these field-names are intermixed on the server side, for each of different one-time tokens 20. For example, the intermixing may result in each field-name having associated therewith the value of another field.

The OT-JS code of the input routine 17 uses a one-time token 20 to limit the validity of the script regarding one or more of the IP-address of the client, field headers, field-names and the order of input-fields 19a and 19b, and the data format of input-fields 19a and 19b. Such limitation of validity is configurable, in real-time, by a supervising authority 22 using a dashboard 21 at the server side. Additionally, the OT-JS code of the input routine 17 uses obfuscation techniques to complicate the possibility of machine-reading the code to re-sample it. Thus at least a part of the JavaScript code strings necessary to properly run the input-routine 17, which are typically easily readable, are written in an encoded form within the JavaScript code.

Furthermore, the OT-JS code of the input routine 17 rearranges the data-field headers of the input-fields 19a and 19b to add extra security and to deter reverse engineering. Additionally, the formats used to represent date and/or time data, for example 6/8/17, 20170608, and 08-06-2017, etc. . . . , and the identifiers used to identify passwords and other fields, such as pw, passw, password, etc., may be randomly changed, for example in a cyclic manner, in each use of input routine 17.

In some embodiments, in addition to changing identifiers of data fields, or data-field headers, dummy data-field headers may be generated and used to rearrange and obfuscate the normally provided JSON data exchange structure. For example, dummy data-field headers may relate to data items which are well-known to be secret, such as as a credit card number, a Card Validation Code (CVC), a bank account number, and the like. Additionally some hidden data-field headers may be used and may be filled automatically, in the background, using JavaScript functions supported by the web-browser 15. Such data-fields include, for example, system-time, time-zone, country, language, screen-size, char-sets, used types, and other browser fingerprinting data. Such manipulation of the data-fields results in greatly increasing the number of data fields from two (login and password) to a larger number, preferably greater than 10, such that the number of possible permutations of data-field headers and values is prohibitively large for a brute force attack.

The server-side guard-application 18 may include an invalidation method 23 which discards a request for a service by the user 11 if the request has an invalid format or invalid validity data. Additionally or alternatively, the guard-application 18 may invalidate a one-time token 20 associated with such a request.

In some embodiments, the secure input routine 17 contains a behavioral authentication procedure 24 which is carried out in the background and which gathers characteristic timing data of each keystroke of the authorized user 11 in inserting authentication-related information. For example, the user 11 was asked to input his credit-card number such as: "5310 #### #### ####" in a first input-field 19a, and his secure password in a second, preferably anonymized, input-field 19b. In the present example, each key in the credit card number and in the password is pressed for 10 ms, and 25 ms elapse between the user releasing the current key and pressing the next key. Transition from input field 19a to next input field 19b takes the authorized user 11 100 ms. When the authorized user 11 fills the input field 19a, he/she presses the character-keys: '5'+'3'+'1' . . . and thus generates a first characteristic time sequence: {down, '5', 0 ms}, {up, '5', 10 ms}, {down, '3', 35 ms}, {up, '3', 45 ms}, {down, '1', 70 ms}, {up, '1', 80 ms}, etc, where the durations are cumulative durations from the beginning of entering the character sequence. This sequence is represented in JSON internal (decimal) code as: {0, 53, 0}, {1, 53, 10}, {0, 51, 35}, {1, 51, 45}, {0, 49, 70}, {1, 49, 80}, etc. Once the user has completed input field 19a, the authorized user 11 enters his password: "*****" in the second, preferably anonymized, input-field 19b and generates a second characteristic time sequence: {down, 1th key, 180 ms}, {up, 1th key, 190 ms} {down, 2th key, 215 ms}, {up, 2th key, 225 ms}, {down, 3th key, 250 ms}, {up, 3th key, 275 ms}, etc. which sequence is represented in JSON internal (decimal) code as: {0, 0, 180}, {1, 0, 190}, {0, 1, 215}, {1, 1, 225}, {0, 2, 250}, {1, 2, 275}, etc. When filling out the password input field 19b, for each key-time data, the identity of the associated character-key which was pressed by the user is ignored, and is represented by the position of that character key within the time ordered sequence, thereby anonymizing the sequence. In some embodiments, control-keys, such as "ctrl+C" and "ctrl+V", are assigned a special code, different to the position within the time ordered sequence, to identify these also in the anonymized time ordered sequence of the pressed character keys. Thus, for example, a lazy fraudster 14 using copy and paste functions to input a stolen password copied from a list would simply press: "ctrl+C" and "ctrl+V" which is represented in JSON internal code using 'ESC'-sequences as: {0, 27, 180}, {0, 17, 180}, {0, 118, 180}, {1, 27, 190}, {1, 17, 190}, {1, 118, 190} and thus very different from the behavior of authorized user 11 and as such easily detectable by the guard-application 18 as a fraudulent access attempt.

The secure input routine 17 further includes a Remote Access Detection module 25, which runs in the background and which gathers characteristic time data of keyboard input 7a and/or of mouse input, which are also detected by the guard-application 18 on the server 2. Specifically, in a preliminary step, time data of mouse input received from the authorized user is gathered and a profile, such as a statistical profile, of detected sample rates of mouse data of the authorized user 11 is built and stored, for example in storage element 6 of device 3 or in another storage element associated therewith. In a later, second, step sample rates of mouse data currently input into the system by the current user are compared with the sample rates of mouse data for the authorized user included in the stored profile. If the current sample rate is lesser than a threshold 10 ms or significant different to the stored user profile the current access attempt is flagged as a Remote Access event.

However, as is known in the art, remote access programs or modules often modify the sample rates, for example in order to optimize transmission rates. This may be problematic in situations in which the authorized user 11 wishes to remotely access his own account. As such, in some embodiments, the sample rate is given a lesser weight in the profile than other movement features and characteristics, such as the velocity of movement, acceleration of movement, and curvature, which are not modified by the remote access.

Similarly, the time data of keyboard input 7a are gathered. In a preliminary first step time data of keyboard input 7a received from the authorized user 11 is gathered and a profile, such as a statistical profile, of detected sample rates of keyboard data 7a of the authorized user 11 is built and stored, for example in storage element 6 of device 3 or in another storage element associated therewith. In a later, second, step, sample rates of keyboard data 7a currently input into the system by the current user are compared with the sample rates of keyboard data 7a for the authorized user 11 included in the stored profile. Specifically, the dwell times for pressing the keys of the keyboard 7a down or up are gathered and compared. If the dwell time is lower than a threshold of 16 ms, the user access is flagged as a potentially fraudulent remote access. In some embodiments, the variance of the sample rate of the keyboard data 7a, which is greater when remotely accessing a web-page 16 than when accessing it directly, is also gathered and used as part of the profile of the authorized user 11, which is then compared to the current variance.

An exemplary OT-JS code, generated by the web-application 9 (FIG. 1) for the client-side while using the secure input routine 17 (FIG. 1), is shown, partially in pseudo-code, in FIG. 2. The function getOTJS( ) generates a user specific and session specific OT-JS code of the secure input routine 17 (FIG. 1) of the specific web-page 16 used as input-page, based on a standard or basic JavaScript code provided by the method getBasicJavaScript( ). The data-field headers of the input-fields 19a, 19b (FIG. 1) are rearranged, and the time data formats and input field identifiers are randomly cyclicly changed by the method randomizeJavaScript( ).

The OT-JS code is further obfuscated so as to be hard to understand by the method obfuscateJavaScript(otjs, seed), and finally, to limit the validity of the script as described above, a randomly generated ID of the web-page 16 (FIG. 1) is included by the method addId( ). The thus generated OT-JS code is later validated at the server-side by the guard-application 18 (FIG. 1), for example based on time data related to a valid ID, user-ID and session-ID, which are obtained using the methods getId( ), getUserId( ) and getSessionId( ). The specific one-time token 20 (FIG. 1) for the code is obtained, based on the ID, by the method getToken( ). The validity of the one-time token 20 (FIG. 1) may be determined in various ways, as well as the validity of the user-ID and the session-ID. Only if all tests return a valid answer, the method decodeOTJS( ) determines the correct relation of the timestamps based on the OT-JS code and returned to the calling function.

Figure 3:
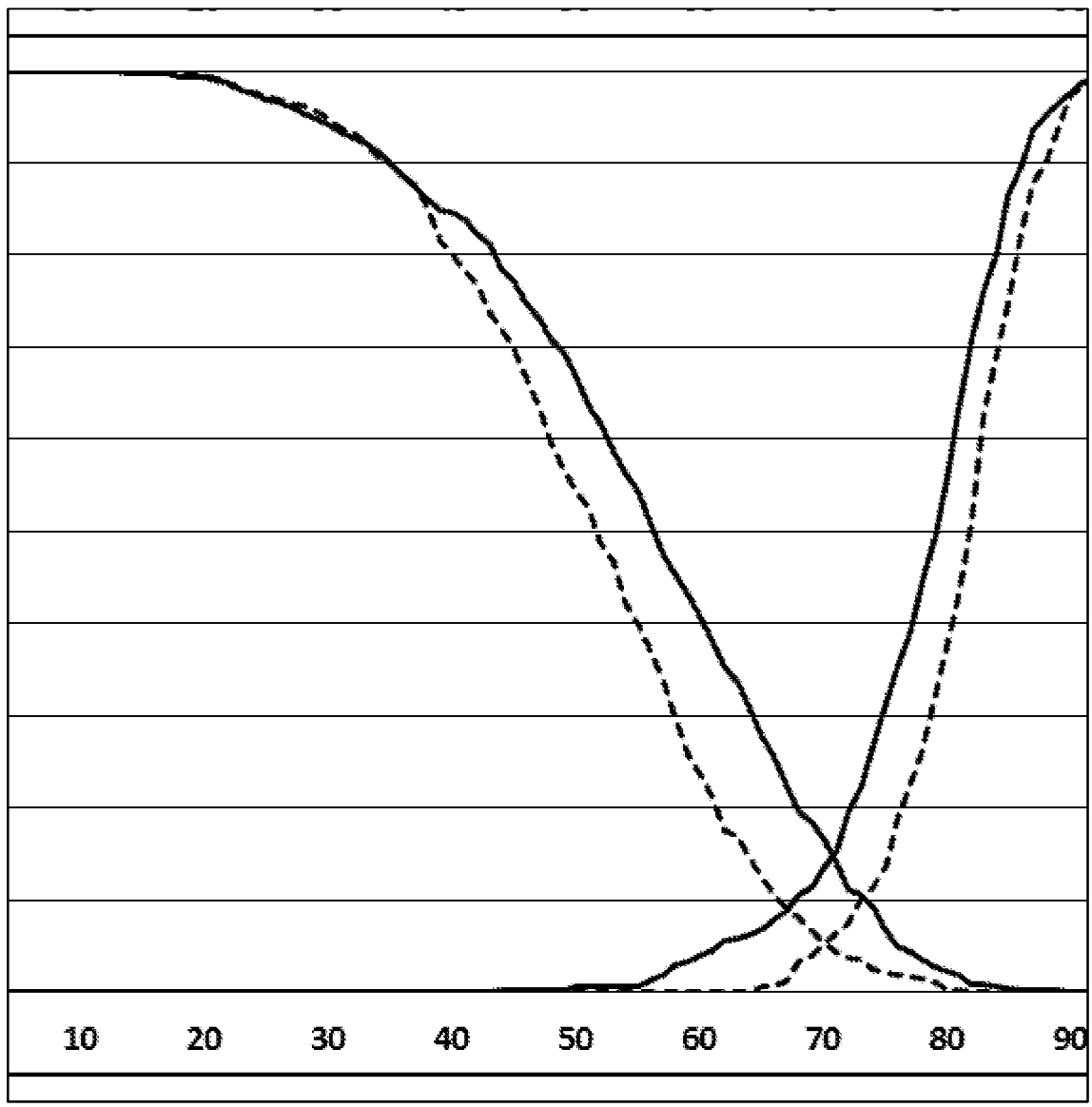
FIG. 3 shows examples of measured scores of an EER-diagram of a behavior-check for input-fields.

FIG. 3 illustrates an Equal Error Rate (EER) diagram, which includes a specific type of double sided error integrals. EER is score most commonly used to measure the accuracy of a statistical classification or detection system. The illustrated diagram shows the behavior-check of the two input-fields 19*a*, 19*b* of the input routine 17 (FIG. 1). The EER diagram for input field 19*a*, which represents the login, is shown as a solid line, and the ERR diagram for input field 19*b*, which represents the password, is shown as a dashed line. The later EER, shown as a dashed line, (for entering username and password) uses anonymized data only, whereby login gets 5% EER and password gets 10% EER, which is worse than in the profile of the normal case but it is good enough to verify the authorized user 11 (FIG. 1) based on his in advanced stored profile and his recent behavior when entering his username and password in the keyboard 7*a* (FIG. 1). The wider gap between the left and right side walls shows that the anonymous fields score used for the password is not as good as the non anonymous field score used for the login, but "just" capture all keystrokes regardless their meaning also gives a significant value the compare the behavior.

While the disclosed invention has been taught with specific reference to the above embodiments, a person having ordinary skill in the art will recognize that changes can be made in form and detail without departing from the spirit and the scope of the disclosed invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed invention.

The invention claimed is:

1. A method for authentication of a user to a web-application based on a client-server-structure, the method comprising:

on a client side of the client-server structure, using a web-browser for web-pages written in JavaScript to execute One Time JavaScript (OT-JS) code based on a unique one-time token, said OT-JS code is included in a secure input routine written in JavaScript;

querying a user, using at least one input-page containing said secure input routine, for authentication-related information, said at least one input-page including JavaScript Object Notation (JSON) code which is interpreted and executed by a JavaScript interpreter of said web-browser; and ensuring correct execution of said OT-JS code by a guard-application on the server wherein the OT-JS code of said input routine uses a rearranging of data-field headers of at least two input-fields to add extra security and to deter reverse engineering, wherein said rearranging includes randomly changing time data formats and identifiers for each use of said code.

2. The method of claim 1, wherein the secure input routine contains said at least two input-fields for two different authentication-related information items, wherein field-names of the JSON code of said at least two input-fields are intermixed on the server side for different one-time tokens.

3. The method of claim 1, wherein the OT-JS code of said input routine uses a one-time token to limit the validity of the JSON code to protect against reuse.

4. The method of claim 3, wherein said limiting is carried out in real-time and is configurable using a dashboard of a supervising authority.

5. The method of claim 1, wherein the OT-JS code of said input routine uses obfuscation techniques to complicate a possible machine-reading of the code to resample the code.

6. The method of claim 1, wherein the rearranging of said data-field headers also includes creating dummy data and/or internal data by JavaScript-functions of the web-browser.

7. The method of claim 1, wherein said guard-application contains an invalidation method which discards a request with an invalid format or validity data and/or invalidates an associated one-time token thereof.

8. The method of claim 1, wherein the secure input routine contains a behavioral authentication procedure which occurs in the background, and which gathers characteristic time data of each keystroke of the user to be authenticated.

9. The method of claim 8, wherein, in said characteristic time data, an identification of a character-key pressed by the user is anonymized into a position of the pressed character-key within a time ordered sequence of pressed character keys.

10. The method of claim 8, wherein, in said characteristic time data, an identification of control-keys pressed by the user is anonymized into a special code different from a position of the pressed control key within the time ordered sequence.

11. The method of claim 1, wherein the secure input routine contains a Remote Access Detection module which runs in the background and gathers characteristic time data of keyboard and/or of mouse input, such that remote access is detectable by said guard-application on the server side.

12. The method of claim 1, wherein said guard application includes:

in a preliminary step, detecting sample rates of mouse input of an authorized user, generating a profile of said detected sample rates, and storing said profile; and in a second, subsequent step, comparing currently detected sample rates of mouse data to sample rates of mouse data in the stored profile thereby to determine whether the current user is the authorized user.

13. The method of claim 12, wherein said profile further includes data relating to normal movement features, and wherein, within said profile, data relating to the sample rate has a lesser weight than data relating to the normal movement features.

14. The method of claim 1, wherein said guard application includes in a preliminary first step, detecting sample rates of keyboard data of an authorized user, generating a profile of said detected sample rates, and storing said profile; and in a second, subsequent step, comparing currently detected sample rates of keyboard data to sample rates of keyboard data in the stored profile, thereby to determine whether the current user is the authorized user.

15. The method of claim 14, wherein said detecting sample rates includes detecting dwell times for pressing the keys of the keyboard down/up, and wherein said comparing includes using a dwell time threshold for detection of fraudulent users.

16. The method of claim 14, wherein said detecting sample rates includes detecting a variance of the sample rate of the keyboard, and wherein said comparing includes comparing said detected variance.

17. A web-client device, comprising:
one or more processors;
a storage, storing instructions to be executed by said one or more processors, said instructions including including instructions to carry out the method of claim 1;
an input device adapted to receuve ubout from a user and to provide said input to said one or more processors; and
a clock, used by said processor to identify time characteristics of said input received via said input device,
wherein said one or more processors are running said instructions to carry out the method of claim 1, thereby carrying out said method.

18. A method of authenticating a user to a web-application, to be implemented in a system including a client device and a server, the method comprising:
receiving from said client device JavaScript Object Notation (JSON) code representing input of a user in at least two input fields, said input received using an input-page via a web browser executing a secure input routine including One-Time JavaScript (OT-JS) code based on a unique one time token; and
running a guard application to ensure correct execution of said OT-JS code and correct use of said input-page by the user
wherein the OT-JS code of said input routine uses a rearranging of data-field headers of the at least two input-fields to add extra security and to deter reverse engineering, wherein said rearranging includes randomly changing time data formats and identifiers for each use of said code.

19. The method of claim 18, wherein said receiving said JSON code comprises receiving said JSON code following said secure input routine limiting validity of said JSON code to a single use of said JSON code by use of a one-time token, said limiting being carried out in real time.

20. The method of claim 18, wherein said receiving said JSON code comprises receiving said JSON code following obfuscation of said JSON code by said secure input routine.

21. The method of claim 18, wherein said running said guard application includes discarding a web-page request having an invalid format or invalid validity data, and invalidating a one time token associated with said web-page request.

22. The method of claim 18, wherein said receiving said JSON code comprises receiving said JSON code following the occurrence of at least one of the following by said secure input routine:
a. rearranging of data-field headers of the at least two input fields;
b. randomly changing a format of time data for each use of said OT-JS code;
c. adding dummy data and/or internal data to said JSON code;
d. running a behavioral authentication procedure in the background during said user entering said input, said behavioral authentication procedure gathering characteristic time data of each keystroke of the user to be authenticated.

23. The method of claim 22, wherein said characteristic time data includes an identification of the character key pressed by the user, and wherein:
an identification of a character-key pressed by the user is anonymized into a position of the pressed character-key within a time ordered sequence of pressed character keys; and
an identification of control-keys pressed by the user is anonymized into a special code different from a position of the pressed control key within the time ordered sequence.

24. The method of claim 18, wherein said running said guard application includes:
receiving and storing a profile of said detected sample rates of mouse input of an authorized user, detected by said client server; and
in a second, subsequent step, comparing currently detected sample rates of mouse data to sample rates of mouse data in the stored profile thereby to determine whether the current user is the authorized user.

25. The method of claim 18, wherein said running said guard application includes:
receiving and storing a profile of said detected sample rates of keyboard input of an authorized user, detected by said client server; and
in a second, subsequent step, comparing currently detected sample rates of keyboard data to sample rates of keyboard data in the stored profile thereby to determine whether the current user is the authorized user.

26. The method of claim 25, wherein said receiving and storing a profile comprises receiving an storing a profile additionally including at least one of dwell times for pressing the keys of the keyboard down/up and a variance of the sample rate of the keyboard, and wherein said comparing includes comparing currently detected dwell times or variance to the stored dwell time or variance.

* * * * *